United States Patent [19]

Vives

[11] 4,388,799
[45] Jun. 21, 1983

[54] APPARATUS FOR TRACKING THE PITCH OF HELICAL GROOVES

[75] Inventor: Jean-Patrick Vives, Calais, France

[73] Assignee: Les Cables de Lyon, Clichy Cedex, France

[21] Appl. No.: 360,539

[22] Filed: Mar. 22, 1982

[30] Foreign Application Priority Data

Mar. 20, 1981 [FR] France .................................. 81 05593

[51] Int. Cl.³ .......................... B65H 81/08; D07B 5/00
[52] U.S. Cl. .............................................. 57/6; 57/11; 57/352; 57/361
[58] Field of Search .......................... 57/3, 6, 9, 11, 13, 57/17, 18, 264, 293, 311, 352, 361

[56] References Cited

U.S. PATENT DOCUMENTS

| | | | |
|---|---|---|---|
| 4,112,660 | 9/1978 | Ferrentino et al. | 57/352 X |
| 4,154,049 | 5/1979 | King et al. | 57/9 |
| 4,195,468 | 4/1980 | King et al. | 57/352 X |
| 4,205,899 | 6/1980 | King et al. | 57/9 X |
| 4,237,687 | 12/1980 | Vecchis et al. | 57/361 |
| 4,309,864 | 1/1982 | Hulin | 57/6 |
| 4,309,866 | 1/1982 | Fombellida | 57/352 X |
| 4,325,212 | 4/1982 | Hope | 57/9 X |

FOREIGN PATENT DOCUMENTS 20189 12/1980 European Pat. Off. .
2022644 12/1979 United Kingdom .
2023060 12/1979 United Kingdom .

Primary Examiner—Donald Watkins
Attorney, Agent, or Firm—Sughrue, Mion, Zinn, Macpeak & Seas

[57] ABSTRACT

Apparatus for tracking the paths of helical grooves at the periphery of a longitudinal core driven in translation. The apparatus comprises two disks (11, 12) fitted onto said core, said disks being connected together by metal wires (13) forming a spring which presses on the grooves (21, 22) to track their apparent rotation when said core (2) moves in translation.

Application to laying optical fibres on a grooved carrier core.

7 Claims, 5 Drawing Figures

APPARATUS FOR TRACKING THE PITCH OF HELICAL GROOVES

The present invention relates to an apparatus designed to track the pitch of helical grooves, which apparatus is used in particular in a unit for laying optical fibres in helical grooves disposed around the periphery of a carrier core to constitute an optical fibre cable which may be of very great length.

BACKGROUND OF THE INVENTION

Usually, optical fibres are fed from feed spools to be laid in the helical grooves of a carrier core which is then driven in translation, said feed spools being mounted on a plate or support rotating at a rate of one turn per pitch length advance of the carrier core and its grooves. Consequently, the spool plate or support rotation speed must be permanently synchronized with the apparent rotation of the helical grooves about the axis of the core during its translation movement so that the spools feed the fibres at a correct angle and are consequently well positioned in the grooves.

In accordance with a previously made suggestion, a die bearing a stud which engages a helical groove in the core has the function of allowing electric detection of the apparent rotation speed of the helical grooves during the translation movement of the core. In the corresponding fibre laying unit for laying fibres on the grooved core, said stud is a relatively fragile component and further, it causes or may cause wear and hence damage to the profiles of the grooves and is itself subject to very rapid wear.

The present invention aims to remedy such drawbacks by producing a simple but very strong apparatus for tracking the paths of helical grooves in the periphery of a core whose groove paths the apparatus follows when the core is moved in translation.

SUMMARY OF THE INVENTION

The present invention provides an apparatus for tracking the paths of helical grooves in the periphery of a longitudinal core driven in translation, wherein the apparatus comprises two disks fitted onto said core, said disks being connected together by metal wires forming springs press on the grooves to track their apparent rotation when said core moves in translation.

The disks thus connected together constitute a follower cage around the grooved core which is driven at the rate of apparent groove rotation as the core moves in translation. The cage is used in a fibre-laying unit for laying optical fibres in the helical grooves of a carrier core and by means of an associated detector it electrically detects the apparent phase position of groove rotation, while by analogous means it detects the phase position of said optical fibre spool plate or support, said detected phase positions being used to correct or to servo control the phase position of the spool plate or support.

Preferably, each of the disks has a slot which is at least as long as the grooved core is wide and which extends from a substantially central zone to the periphery of the disk for the follower cage to be installed directly on said core, said cage being constituted by wires which form a spring on said core.

BRIEF DESCRIPTION OF THE DRAWINGS

An embodiment of the invention is described in greater detail with reference to the accompanying drawings in which.

MORE DETAILED DESCRIPTION

Figure 1:
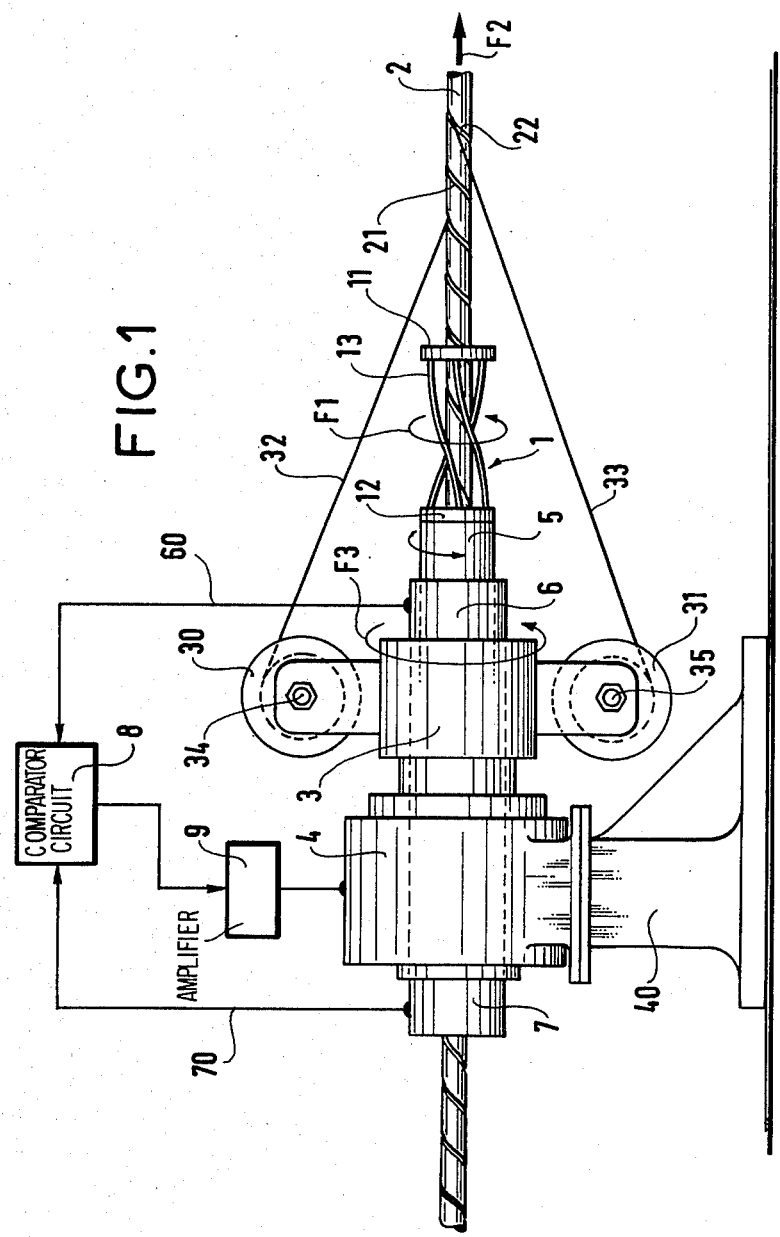
FIG. 1 is a partial diagrammatic and partial side elevational view showing a unit for laying optical fibres on a grooved core equipped with apparatus in accordance with the invention.
Figure 2:
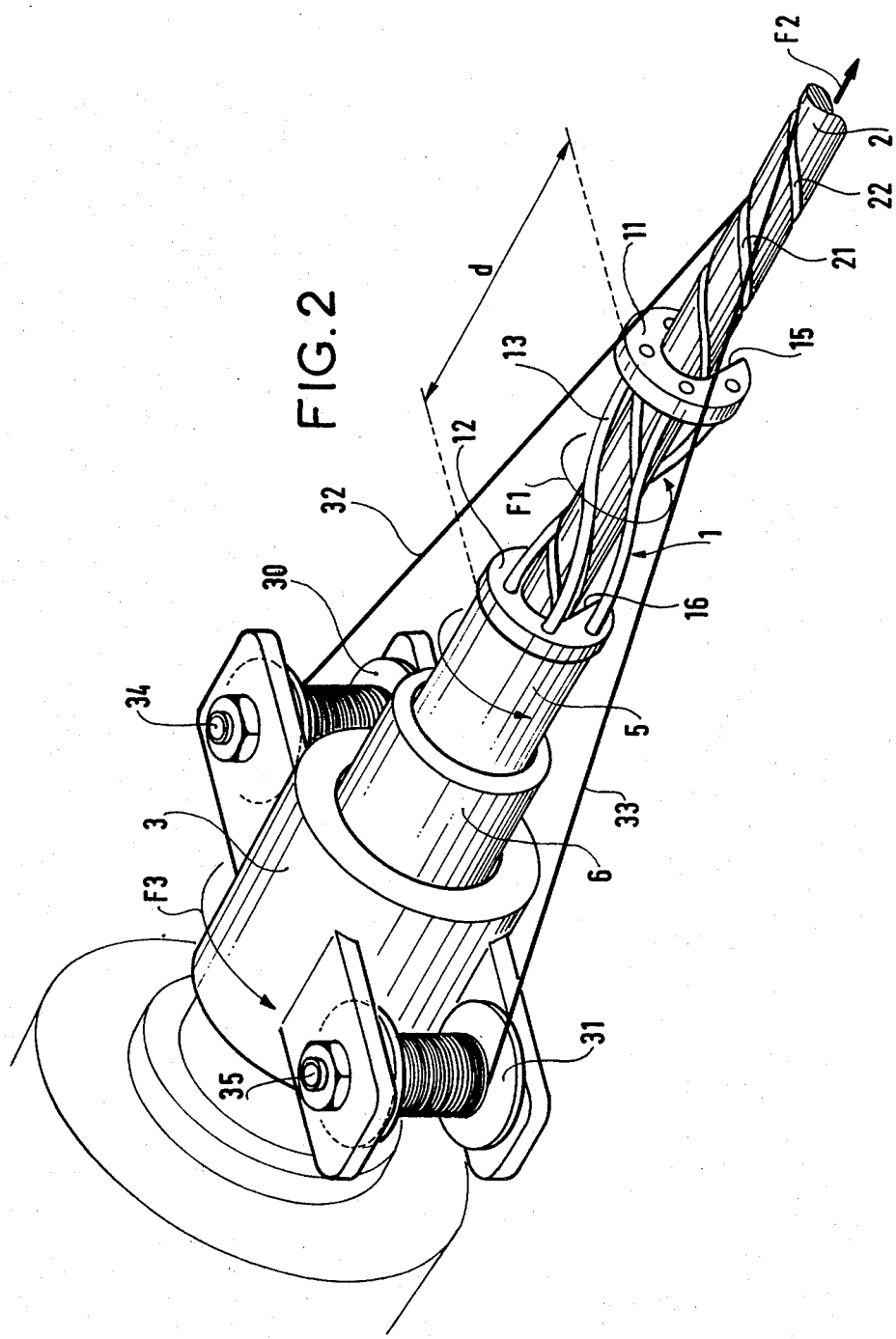
FIG. 2 is a partial perspective view of the unit FIG. 1.

In FIGS. 1 and 2, apparatus of the present invention for following the paths of helical grooves is generally referenced 1. It is installed on a cylindrical core 2 having helical grooves 21 and 22 in its periphery, and in the present case, there are two grooves whose pitches are to be followed during the translation movement of the core 2 through the apparatus 1 in the direction of an arrow F2. The core may be driven by any appropriate means, not illustrated.

The apparatus 1 for following the paths of grooves in accordance with the invention has two disks 11 and 12 connected together by steel wires 13—in the present case, there are four wires which form springs.

Each of the wires has its ends fixed to respective ones of the disks and the wires are evenly spaced around the peripheries of the disks. The diameter of the wires is at least slightly greater than the width of the grooves 21 and 22 to which their central portions are closely applied, two steel wires bearing against the outer profile of each of the grooves in two zones separated from each other substantially by one half pitch of the helical grooves. Said apparatus 1 constitutes a groove pitch follower cage when the core 2 is driven through in translation. Advancing the core 2 by one groove pitch in translation in the direction of the arrow F2 causes the apparatus 1 to rotate one turn in the direction of the arrow F1.

As seen in FIG. 2, each of the disks 11 and 12 has a hole at its center and a slot, 15 and 16, respectively, extends from the hole to the periphery of the disk considered. These slots are at least slightly wider than the diameter of the core 2 so as to allow the apparatus 1 to be installed directly on said core i.e. without requiring prior dismantling of the apparatus 1 or disconnecting of the core 2.

In the example illustrated, said apparatus 1 is used in a unit for positioning optical fibres in helical grooves 21 and 22 of the core 2 which then constitutes a core for constructing an optical fibre cable.

Optical fibres 32 and 33 are supplied by two feed spools 30 and 31. These spools 30 and 31 rotate freely on their respective axes 34 and 35 and are mounted on a cylindrical support 3 by means of arms which bear no reference symbol, said cylindrical support being rotated in the direction of an arrow F3 by an electric motor 4 borne on a support 40. The optical fibres are initially inserted and held in the grooves at one end of the carrier core. The core then advances and the fibres will automatically be inserted in the grooves when the core 2 provided the support 3 rotates in synchronism with the translation of the core 2.

For this purpose, the apparatus in accordance with the invention is mounted on a fibre-free portion of the carrier core 2 and follows the translation movement of the core, turning once about its axis for and advance of one groove pitch by the core 2. A cylindrical component 5 is integral with one of the disks which it extends along the carrier core. It can optionally form part of the apparatus 1 and can optionally form a single cylindrical part with the disk 12. It has a longitudinal bore along the axis of the core which passes through it and has a longitudinal slot (not shown and therefore not referenced), which extends said central bore to the periphery of the cylindrical component 5 in an analogous manner to the slots in the disks in order to allow the component 5 to be installed round the core 2.

An electric detector 6 is coupled to the component to detect its angular position. Likewise, a second electric detector 7 is coupled to the motor 4 to detect the angular positioning of the spool support 3. These two detectors 6 and 7 are connected by respective electric connection 60 and 70 to a comparator circuit 8 whose output delivers an error signal representative of the difference between the signals which it receives. Via an amplifier 9, said error signal is applied to controlling the motor 4 which drives the spool support 3 to permanently correct the differences between the angular position of the spool support driven in rotation and the apparent angular position of the grooves as given by the apparatus 1. The spool support rotation phase position is thus permanently synchronized with that of the apparent groove rotation which indicates that the grooved carrier core 2 is moving in translation.

Figure 3:
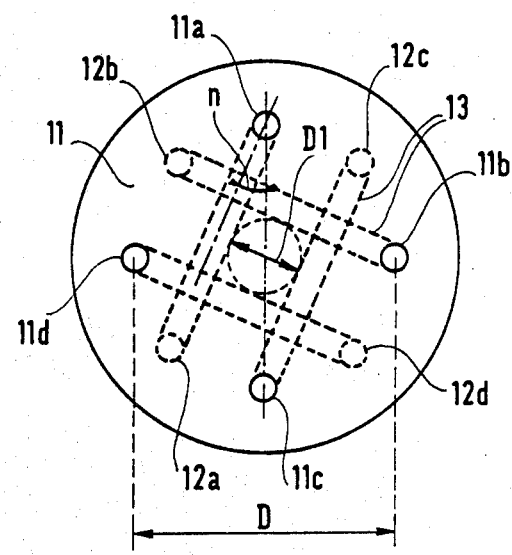
FIG. 3 is a front view of the apparatus illustrated in FIG. 1 before installing on a grooved core.
Figure 5:
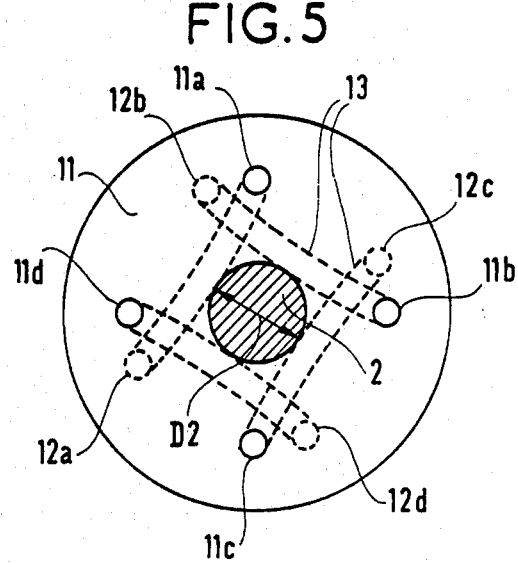
FIG. 5 is analogous to FIG. 3 but shows the apparatus installed on a grooved core.

FIGS. 3 and 5 illustrate the apparatus 1 seen from the end of the disk 11, respectively before and after positioning on the grooved core 2, the disk 11 being illustrated for clearness' sake without a slot in these figures.

In these figures, the thickness of the disks 11 and 12 is ignored and the peripheries of the disk 11 and the disk 12 coincide. Anchor points of wires 13 to the disk 11 are referenced 11a to 11d and anchor points on the disk 12 are referenced 12a to 12d. The projections of the four wires 13 interconnecting the points 11a to 11d and 12a to 12d on the disk 11 are shown dotted.

Figure 4:
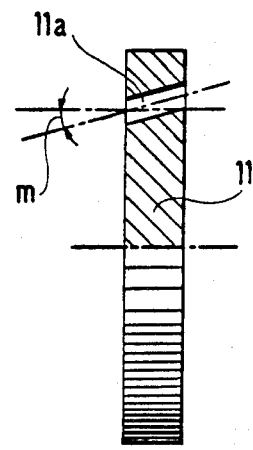
FIG. 4 is a half cut away, side view of one of the components of the apparatus illustrated in FIG. 1.

Referring in particular to FIG. 4 which is an axial half cross-section through the disk 11 showing one of the anchoring holes, it is seen that each of the anchoring points (such as the one referenced 11a) is, in fact in the form of an oblique hole through the disk. In FIG. 4, the angle of the hole relative to normal at the surface of the disk is referenced m. In FIG. 3, the angle between the projection of the hole 11a on the surface of the disk and the corresponding radius which passes through the anchor point 11a is referenced n. These two angles m and n define the direction of each of the holes. The disks are separated by a distance d (FIG. 2). The circle which passes through the anchor points is of diameter D. The parameters m, n, d and D define the diameter D1 of the theoretical cylinder delimited by the wires 13 in the central zone of the apparatus 1, said diameter D1 being slightly smaller than the diameter D2 of the grooved core 2 due to a suitable choice of the parameters m, n, D and d. In these conditions the wires 13 are engaged straight into the holes without any preforming and they remain rectilinear and are not twisted between one disk and the other.

On referring to FIG. 2 and to FIG. 5, it will be understood that during assembly of the apparatus 1 on the core 2 whose diameter D2 is larger than the aforementioned diameter D1, the wires 13 anchored in the disks act as springs relative to the core 2 in the central zone of the apparatus 1 and cause the disk 12 to rotate relative to the disk 11, as schematically illustrated by the relative staggering of the various anchoring points between FIG. 3 and FIG. 5. The thrust of the wires 13 against the core 2 in said central zone is then partially defined by the bending restoring force of the wires 13, but is mainly defined by the twisting restoring force of the wires 13 due to the relative rotation of the disks when the apparatus 1 is assembled on the core 2.

The advantage of the apparatus 1 for locating the apparent rotation of grooves, such as is used in a fibre-laying unit which lays fibres in the grooves of a carrier core, is that it is very strong and is both simple and cheap to manufacture. Due to the fact that it is made of wires which form springs, as can be deduced mainly from the description of FIGS. 3 and 5, the apparatus 1 requires no precise adjustment. Further, these wires which form springs and which normally press hard against the outer profiles of the grooves always have the possibility of momentarily retracting in the event a defect project from the edges of any of the grooves met by any one of them without thereby affecting the rotation speed of the apparatus 1. Lastly, due to the fact that the steel wires press on the outer profiles of the grooves, there is neither wear nor damage to the inner profiles of the grooves in which optical fibres are inserted.

I claim:

1. Apparatus for tracking the paths of helical grooves in the periphery of a longitudinal cylindrical core driven in axial translation, said apparatus comprising two disks fitted onto said core, said disks being connected together by metal wires at their ends forming springs between the disks which press on respective grooves to track their apparent rotation when said core moves in axial translation.

2. Apparatus according to claim 1, wherein said disks have oblique anchoring holes which define directions for anchoring the ends of the wires, the anchoring holes in one disk being aligned with the holes in the other disk but the wires being anchored in holes which are staggered from one disk to the other and said wires being engaged straight in the anchoring holes in the case of each direction and without being performed and acting as springs on said grooved core in a central zone of the apparatus.

3. Apparatus according to claim 1, wherein said wires have a diameter greater than the width of said grooves to ensure they engage the outer profiles of the grooves.

4. Apparatus according to claim 1, wherein each of said disks has a hole in its center and a slot extends from the central hole to the disk periphery to allow the apparatus to be installed on said grooved core without having to dismantle the apparatus.

5. Apparatus according to claim 4, further including a cylindrical component integral with one of the disks with a longitudinal central hole and a slot which extends from the central hole to the periphery of said cylindrical component.

6. Apparatus according to claim 1, wherein said wires are steel wires.

7. An apparatus for tracking the paths of helical screws in the periphery of a longitudinal cylindrical core driven in axial translation, said apparatus comprising:
- two discs fitted onto said core,
- said discs being connected together by metal wires at their ends forming springs which press on respective grooves to track their apparent rotation between said discs when said core moves in axial translation,
- a laying unit which lays optical fibres in the peripheral helical grooves of said carrier core, said laying unit including an opening within the center thereof through which said carrier core passes and comprising motor means for driving said carrier core in axial translation,
- an electric detector for detecting the apparent angular position of said apparatus during axial translation of said carrier core,
- a support for optical fibre feed spools, and
- means for rotating said support coaxially with said carrier core to cause said fibres to rotate about said carrier core such that said electric detector detects the apparent angular position when said carrier core is driven in axial translation to provide a control signal to synchronize the phase of rotation of the support for the optical fibre feed spools to that of the apparent groove rotation of said carrier core as it moves in axial translation.

* * * * *